United States Patent [19]

Dawley et al.

[11] Patent Number: 4,865,133
[45] Date of Patent: Sep. 12, 1989

[54] WEEDING AND FURROWING HOE

[76] Inventors: Paul S. Dawley; Sally Dawley, both of 6010 Morgan Pl., Loomis, Calif. 95650

[21] Appl. No.: 267,239

[22] Filed: Nov. 4, 1988

[51] Int. Cl.⁴ ............................................. A01B 1/08
[52] U.S. Cl. .................................... 172/380; 172/381
[58] Field of Search ................ 172/380, 381, 375, 378

[56] References Cited

U.S. PATENT DOCUMENTS

| | | | |
|---|---|---|---|
| 28,748 | 5/1898 | Painter | 172/375 |
| 96,740 | 11/1869 | Springstead | 172/380 |
| 917,670 | 4/1909 | Shanks | 172/380 |
| 1,954,250 | 4/1934 | Lee | 172/381 X |
| 2,364,208 | 12/1944 | Gravely | 172/375 X |
| 3,015,930 | 1/1962 | Campbell | 172/380 X |
| 4,411,320 | 10/1983 | Hass | 172/380 |

FOREIGN PATENT DOCUMENTS 577080 5/1933 Fed. Rep. of Germany ...... 172/380

Primary Examiner—Richard J. Johnson

[57] ABSTRACT

A gardening tool adapted to serve as a weeding hoe and a furrowing tool comprised of an elongated handle attached to a head part. The head part is five sided and is formed from flat material of generally uniform thickness having top and bottom surfaces angled downwardly from a central longitudinal rib. Two of the sides are shaped as a forwardly pointing "V" and have approximately three concave arcuate notches along the edges thereof. The "V" shaped portion merges into generally parallel sides with a perpendicular connecting rear side. The sides of the head are beveled and sharpened toward the bottom surface. The handle extends upwardly and rearwardly from a midportion of the head.

2 Claims, 1 Drawing Sheet

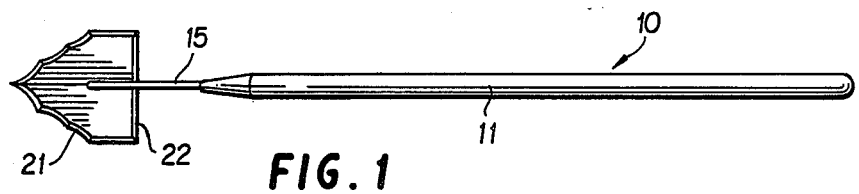
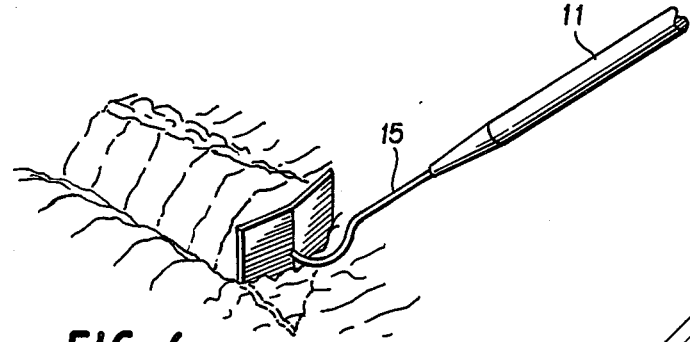
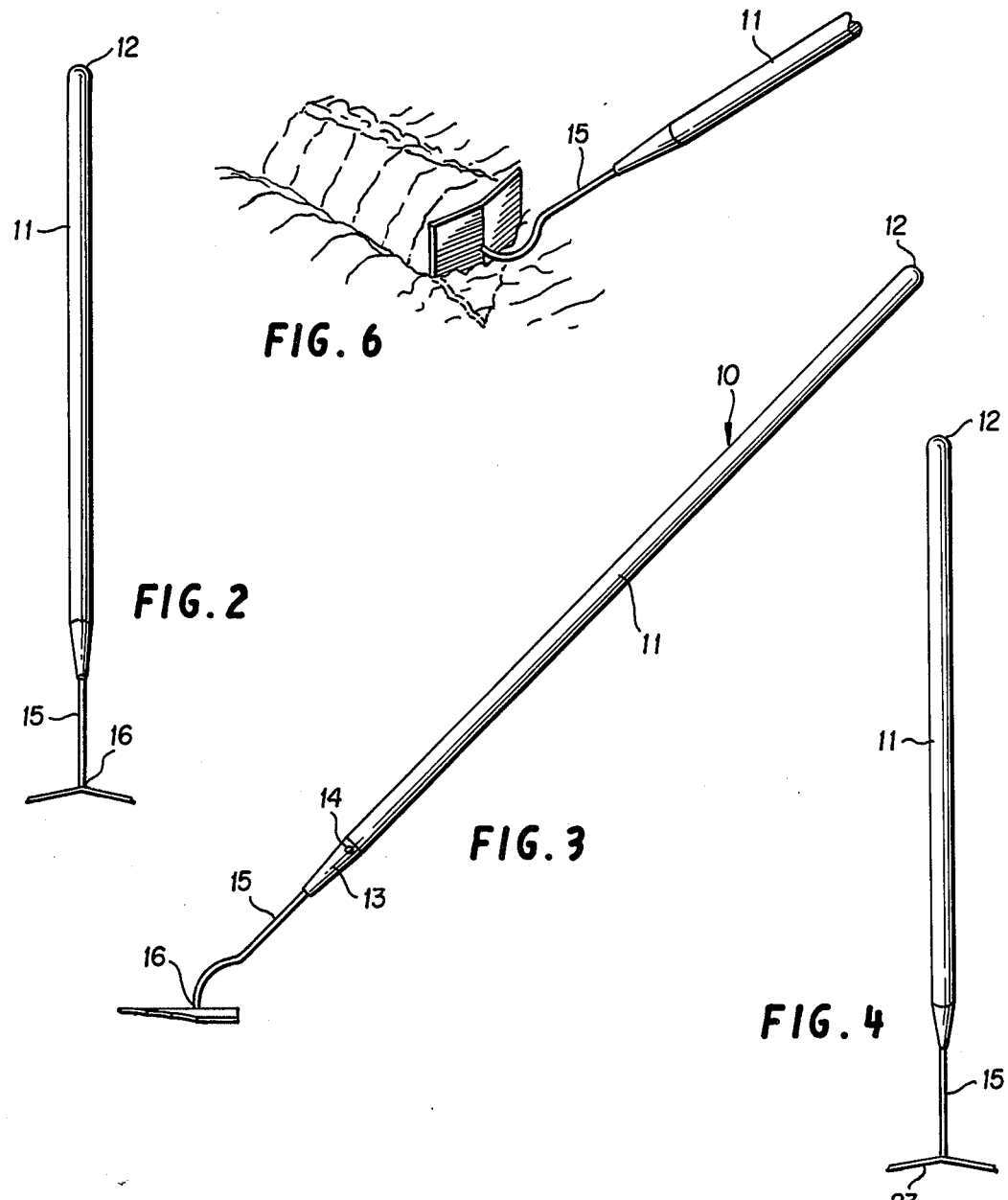
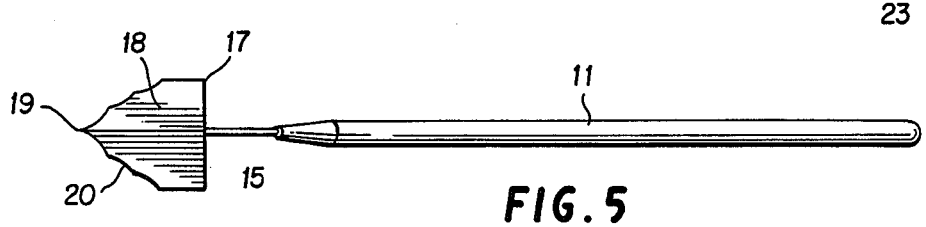

WEEDING AND FURROWING HOE

TECHNICAL FIELD

This invention relates to a weeding and furrowing hoe, particularly the weed removal.

BACKGROUND ART

The prior art research has clearly shown a number of techniques used to provide weeding and earth moving within the garden. These techniques offer a number of options, with various levels of success, for the garden to use.

U.S. Pat. No. 4,730,679 (TALLERICO) Shows a multiple sided tool with each of four sides preforming various functions used in the garden.

U.S. Pat. No. 4,002,207 (BARTZ) Shows a hand operated impliment with an elongated handle accepting various shaped end sections to enable multiple applications of earth working.

U.S. Pat. No. 3,782,770 (LEE) Shows a trenching tool used in digging trenches or furrows, having four sides with three sides being perpendicular from the other in the vertical plane while the fourth side is open to the trench.

U.S. Pat. No. 3,739,562 (McNAMARA) Shows a combination hoe and rake tool with an adjustable angle head device which permits desired angle and use.

U.S. Pat. No. 1,780,741 (CAWALLADER) Shows a weed cutting tool with a flat blade secured to a handle to cut weeds parallel to the ground having a kidney shape head with beveled cutting edges.

SUMMARY OF THE INVENTION

This invention relates to a garden tool. The invention includes an elongated handle and a connected head part with a steel rod joining the two. The handle is made of wood or similar material being rounded to a ball on the handle end, and attached to the steel rod by a tapered socket. The steel rod providing attachment of the multi-purpose head to the handle and allowing reduced surface area for clearence. The rod also gives spring tension and angle of attack to the head which engages the ground at a parallel position when handle is held in a normal position. The multi-function head part provides the gardener with a tool to perform several garden tasks.

The head part is five sided and is formed from flat material of generally uniform thickness having top and bottom surfaces angled downwardly from a central longitudinal rib. Two of the sides are shaped as a forwardly pointing "V" and have approximately three concave arcuate notches along the edges thereof. The "V" shaped portion merges into generally parallel sides with a perpendicular connecting rear side. The sides of the head are beveled and sharpened toward the bottom surface. The handle extends upwardly and rearwardly from a midportion of the head.

Accordingly, the object of this invention is to provide a novel gardening tool that will do several gardening chores. The object is to weed the garden without swinging a hoe. The weeding and furrowing hoe was designed to be used by sliding the head back and forth at or slightly below ground level. By eliminating the swinging and the dangers of other hoes this invention is both energy saving and safer to use.

Another object of the versatile invention is when inverted it becomes a furrowing tool designed to create forrows to the gardeners requirements.

BRIEF DESCRIPTION OF THE DRAWINGS

FIG. 1 Top view of the invention.
FIG. 2 Left side view with the head pointed at you.
FIG. 3 Full perspective view of the invention.
FIG. 4 Right side view with the head pointed away from you.
FIG. 5 Bottom view of the invention.
FIG. 6 Shows the invention inverted as a furrowing tool.

DESCRIPTION OF THE PREFERRED EMBODIMENT

The preferred embodiment, herein described, is not intended to limit the invention in any form or possible use. The embodiments are described to show and explain the practical use of this invention.

Referring now to the drawing FIG. 1, the reference numeral 10, refers to the invention and its uses as a gardening tool. Tool 10 includes an elongated handle numeral 11 made of wood or similar matererial having a rounded ball end numeral 12. A head part designated in FIG. 5 as numeral 18 formed from a durable rigid material such as steel or metal alloys, connected to the handle by a spring rod shown in FIG. 1 numeral 15 being made of steel. Attached to head at numeral 18 by welding an attached to handle numeral 11 by a tapered socket numeral 13. The tapered socket being made of steel or metal alloys and secured to handle 11 by a pin numeral 14 made of steel or metal alloys. The head FIG. 5 numeral 18 being of a flat material having thickness, with sides two of which are shaped as a V with three concave radius surfaces leading to a straight sides with a perpendicular connecting side. The head's beveled surface circumferential area FIG. 1 numeral 12 is sharpened to the lower flat surface. FIG. 4 numeral 23 shows a flat V under surface of equal sides forming a beveled surface of a directional plane.

The various edges of this tool are designed to perform common gardening tasks. The sliding of this tool in a forward or backward motion on or slightly below ground level will allow weed removal quickly and safely with a minimum of effort. Turning this tool FIG. 3 numeral 10 to an inverted position, shown in FIG. 6, illustrates the invention's abilities to furrow the garden. This clearly shows the versatile spirit of the "WEEDING AND FURROWING HOE".

I claim:

1. An improved gardening tool adapted to serve as a weeding hoe and a furrowing tool comprised of an elongated handle attached to a head part, said head part being formed from flat material of generally uniform thickness having a top and bottom surface and having five sides, two of the sides being configured as a forwardly pointing "V" having approximately three concave arcuate notches along the edges thereof, said "V" configured portion merging into generally parallel sides with a perpendicular connecting rear side, said sides being beveled and sharpened toward the bottom surface, said handle extending upwardly and rearwardly from a midportion of the head.

2. The gardening tool claimed in 1 wherein said tool has a bottom flat V surface of equal sides forming a beveled surface and a directional plane.

* * * * *